United States Patent [19]
Lefter

[11] Patent Number: 5,815,544
[45] Date of Patent: Sep. 29, 1998

[54] SELF-CLEANING STRAINER

[76] Inventor: Jan D. Lefter, 17-32 202nd St., Bayside, N.Y. 11360

[21] Appl. No.: 803,314

[22] Filed: Feb. 20, 1997

[51] Int. Cl.[6] .................................................. G21C 19/307
[52] U.S. Cl. ........................... 376/313; 210/408; 210/413
[58] Field of Search .................................... 376/313, 282; 210/107, 396, 408, 413

[56] References Cited

U.S. PATENT DOCUMENTS

| | | | |
|---|---|---|---|
| 782,950 | 2/1905 | Dion | 210/413 |
| 3,823,831 | 7/1974 | LeBlanc, Jr. | 210/408 |
| 5,407,587 | 4/1995 | Westerberg | 210/408 |
| 5,426,679 | 6/1995 | Henriksson | 376/313 |
| 5,453,180 | 9/1995 | Henriksson | 376/313 |
| 5,539,790 | 7/1996 | Henriksson | 376/313 |

*Primary Examiner*—Daniel D. Wasil
*Attorney, Agent, or Firm*—McAulay Fisher Nissen Goldberg & Kiel, LLP

[57] ABSTRACT

A strainer for filtering a pumped fluid has a strainer body having a wall provided with fluid inlet perforations in an outer surface, a surface cleaning scraper or brush in juxtaposition with the outer surface, and a drive operatively connected to the surface cleaner for moving the surface cleaner over the outer surface for removing accumulated debris. At least one nozzle is oriented towards the cleaned outer surface of the strainer body for directing a jet of liquid against the perforations to assure that the perforations are clear. The strainer is thus self-cleaned continuously without requiring a back wash operation, allowing continuous flow through the strainer.

26 Claims, 3 Drawing Sheets

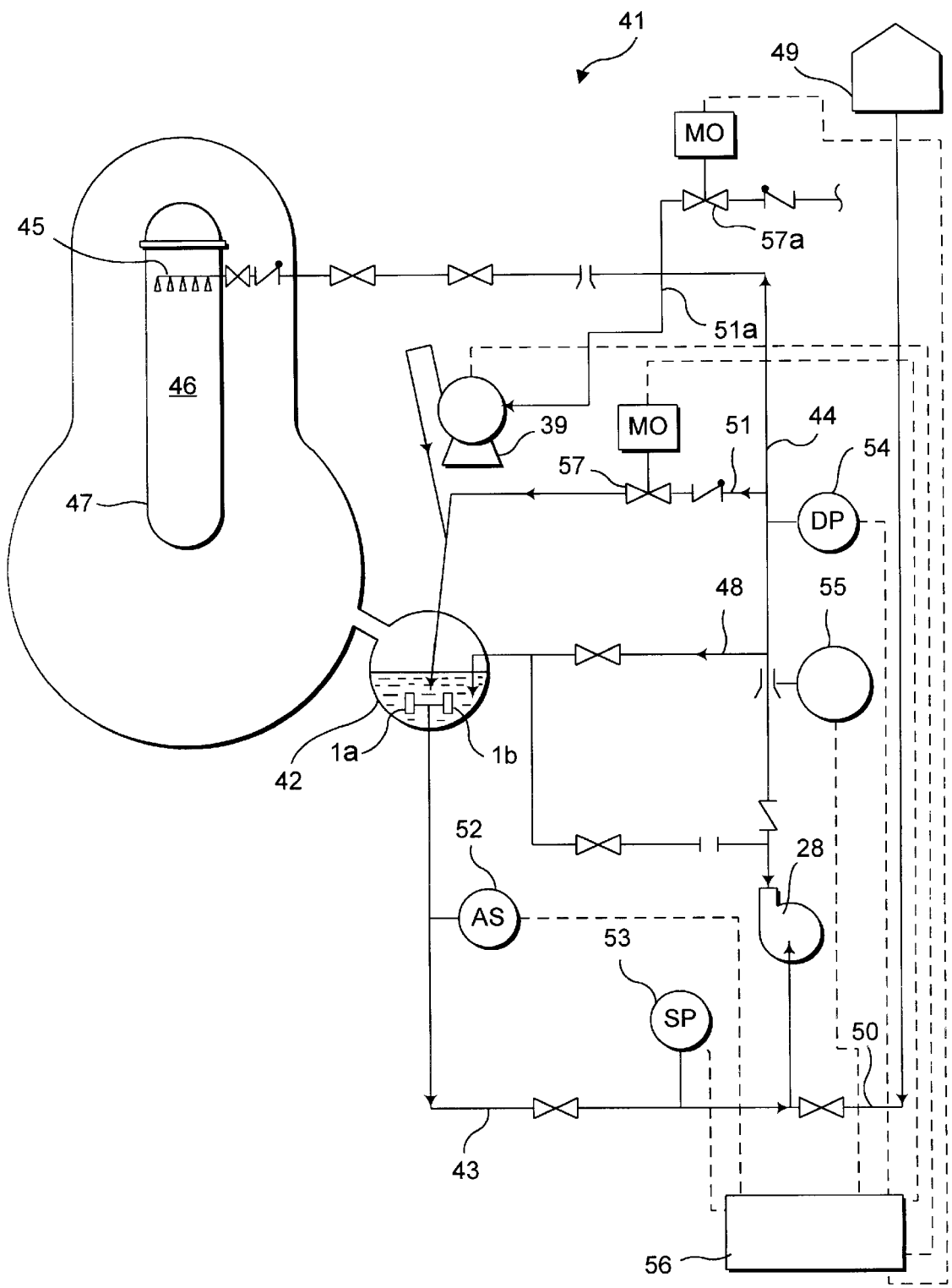
F I G. 3

SELF-CLEANING STRAINER

TECHNICAL FIELD

This invention relates to a strainer for pumps, and more particularly, to a self-cleaning strainer for emergency cooling in a nuclear power plant.

BACKGROUND

An essential component of nuclear reactors is the cooling system. Such cooling systems typically include an operational cooling system for normal reactor situations and a supplemental cooling system to provide emergency cooling of the reactor core.

The emergency cooling system typically includes a suppression pool which stores water collected in the containment area. In certain situations, insulation, debris, rust, dust and other material may be transported to the suppression pool where it is accumulated as a sludge. A strainer is located in the pool to protect the pumps used to supply water for cooling the reactor, as well as to prevent plugging of the spray nozzles used to cool the reactor core. Such strainers screen the water to prevent the sludge and debris mixture which collects in the pool from blocking the cooling system. Of course, with time, the strainer itself will become blocked with such debris, unless steps are taken to prevent this.

For some designs, during normal operation, the strainers are cleaned by reversing the flow through the pumps, thereby blowing accumulated sludge and debris off of the strainers. This backwashing method has the disadvantage of requiring at least a portion of the cooling system to be shutdown during the back wash. For example, multiple pumps may be used to assure redundancy in the provision of the cooling water to the reactor but maximum flow is achieved when all the pumps are on line. Also, it is likely that the strainers associated with the pumps will become restricted at approximately the same rate, thus further reducing the flow and making it difficult to maintain cooling should one pump be taken off line.

While such back washing may be acceptable for an operations type cooling system, in the event of an emergency, it is simply unacceptable to halt, even partially, the flow of cooling water to the reactor.

In U.S. Pat. No. 5,453,180, a back wash type strainer, though explained as being generally unacceptable for emergency type cooling systems, is described which includes means for dividing the built up debris on the outside of the strainer into several discrete sections which are more easily released by a back wash than a continuous layer of debris. Though a possible improvement, it is still necessary to back flush the strainer to remove the accumulated debris.

Several other strainers are known, such as the one described in U.S. Pat. No. 3,823,831, which utilizes a ball shaped strainer which rotates to catch and then discharge debris. However, such a strainer is limited in terms of size and capacity, and the complicated rotation mechanisms could be subject to binding, requiring that the strainer be disassembled if it becomes plugged, which is unacceptable in nuclear service during an emergency condition.

SUMMARY OF THE INVENTION

It is an object of the present invention is to provide a self-cleaning strainer for a nuclear reactor cooling system with means for effectively cleaning the strainer of sludge and debris without back washing.

It is another object to provide a continuous self-cleaning strainer where cleaning is effected during operation, without the necessity for a system shutdown, and without reducing fluid flow.

It is another object to provide a self-cleaning strainer which prevents strainer blockage in the presence of insulation debris and sludge in a suppression pool during emergency operation.

These and other objects of the present invention are achieved by a strainer for filtering a pumped fluid comprising a strainer body having a wall with a plurality of fluid inlet perforations. The wall has an outer surface, at least one surface cleaner, though preferably more than one cleaner is used, which may be a scraper or a brush in juxtaposition with the outer surface, and a drive operatively connected to the surface cleaner for moving the surface cleaner over the outer surface. At least one nozzle, and preferably a plurality of nozzles are associated with the surface cleaner and oriented towards the portion of the outer surface cleaned by the surface cleaner for directing a jet of liquid against the scraped or brushed outer surface to assure that the perforations in the cleaned outer surface are cleared.

The strainer body is preferably cylindrical and has a cylindrical wall. The strainer body also has a planar end wall provided with a plurality of perforations. Optionally, at least one or more additional nozzles are preferably provided and oriented towards the planar end wall to provide a jet of liquid to clear the perforations. An end wall cleaner could also be used to remove heavy debris.

A method for filtering pumped fluid comprises coupling a strainer body to an inlet conduit of a pump, the strainer body having a wall provided with fluid inlet perforations and having an outer surface, locating the strainer body in a pool of the fluid to be pumped, operating the pump to draw fluid through the inlet perforations, continuously moving a scraper or brush over the outer surface to remove accumulated debris and continuously directing a jet of liquid against the scraped or brushed outer surface of the strainer body to clear the inlet perforations.

A self-cleaning strainer in accordance with the present invention is effectively cleaned of sludge and debris during operation, without the necessity for system shutdown. Such a self-cleaning strainer is not blocked by debris and sludge in the suppression pool, thus preventing emergency core cooling system blockage during both normal and emergency operation.

BRIEF DESCRIPTION OF THE DRAWING

FIG. 3 is a diagram showing a spray cooling loop for a nuclear reactor.

DETAILED DESCRIPTION OF THE INVENTION

Figure 1:
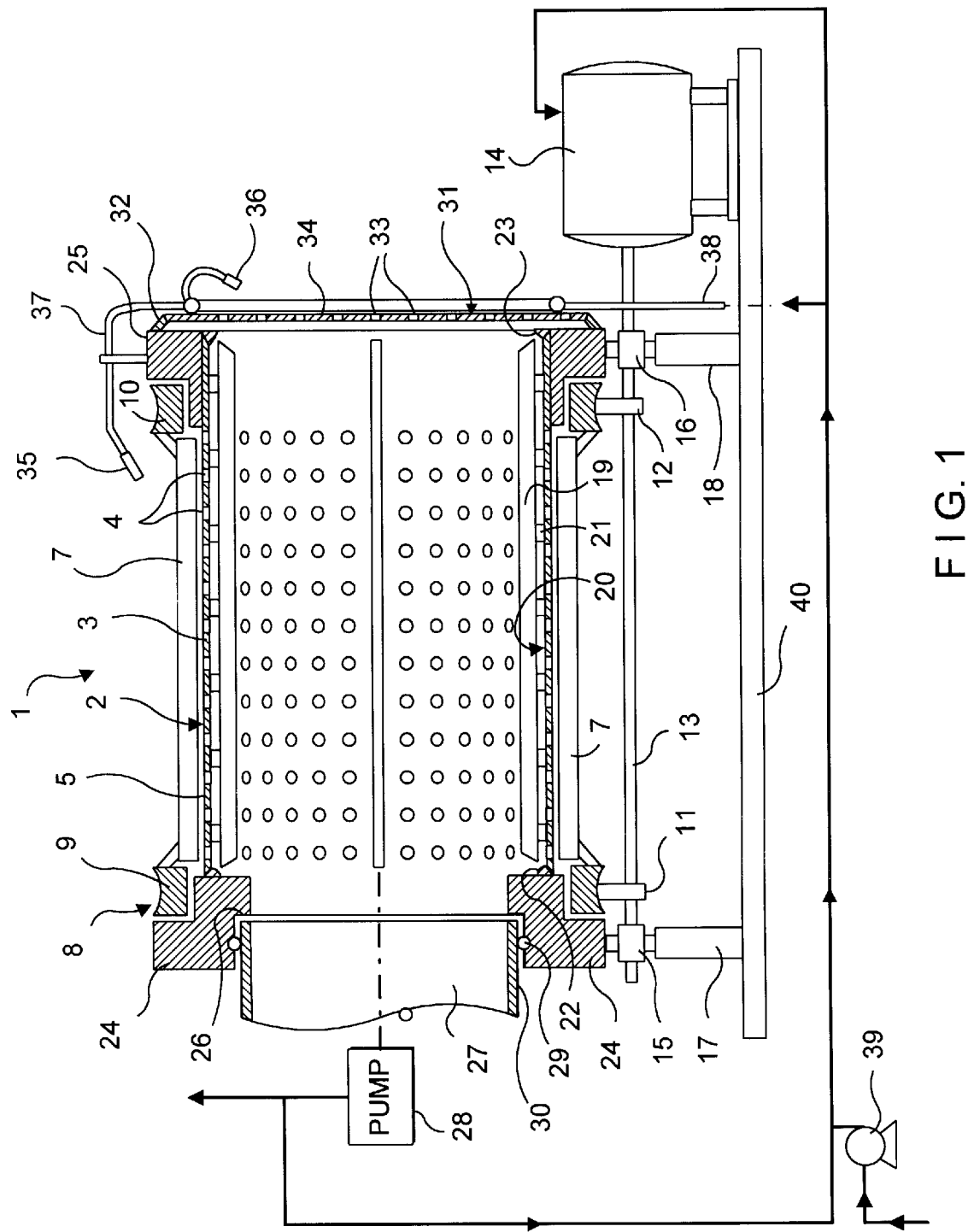
FIG. 1 is a partial schematic longitudinal cross-sectional view and a partial block diagram of a self-cleaning strainer in accordance with the present invention.

Referring to FIG. 1, a strainer assembly 1 for filtering a pumped fluid such as water, for example, in an emergency core cooling system of a nuclear reactor facility, comprises a cylindrical strainer body 2 having a cylindrical wall 3 provided with an array of fluid inlet perforations 4. Typically, these perforations have a diameter of about 0.1 inch to limit the size of debris passing through the strainer. The size is a function of various design parameters, such as the spray nozzle tolerance for debris, or approach velocity, which is generally recommended to be about 0.2 to 0.5 ft/sec. Of course, the strainer perforation design must be determined on a case by case basis, but regardless of the design chosen, the present invention is useful in keeping the perforations clear to optimize fluid flow.

The strainer body 2 has an outer surface 5, the water flowing from the outer surface, through the perforations into the strainer body. A plurality of scrapers 7 extend longitudinally in juxtaposition to the outer surface 5. Brushes could also be used as the surface cleaner, as these also provide a physical contact type of cleaning of the outer surface 5. Of course, other such surface cleaners may be used. The scrapers 7 are mounted to a carrier or frame 8 which is rotatable about the strainer body 2. To that end, the carrier 8 incorporates a pair of axially spaced worm gears 9 and 10 meshing with respective gears 11 and 12 (schematically illustrated) on an output shaft 13 of a hydraulic actuator or electric motor 14. A hydraulic drive is preferred for its ease of integration with the fluid flow loop. The shaft 13 is journaled in two bearings 15 and 16 disposed in or on respective support posts 17 and 18.

The cylindrical wall 3 is a thin sheet supported internally by a plurality of axially extending stiffener ribs 19 which are fixed to an inner surface 20 of the cylindrical wall 3 by multiple welds 21. At its opposite ends, the cylindrical wall is attached by welded seams 22 and 23 to a pair of annular braces or collars 24 and 25 which are supported on posts 17 and 18. The brace 24 is provided with a recessed shoulder 26 on which an inlet conduit 27 leading to a water pump 28, shown schematically, is seated. A sealing ring 29 is provided between an outer surface 30 of the inlet conduit 27 and the brace 24.

Figure 2:
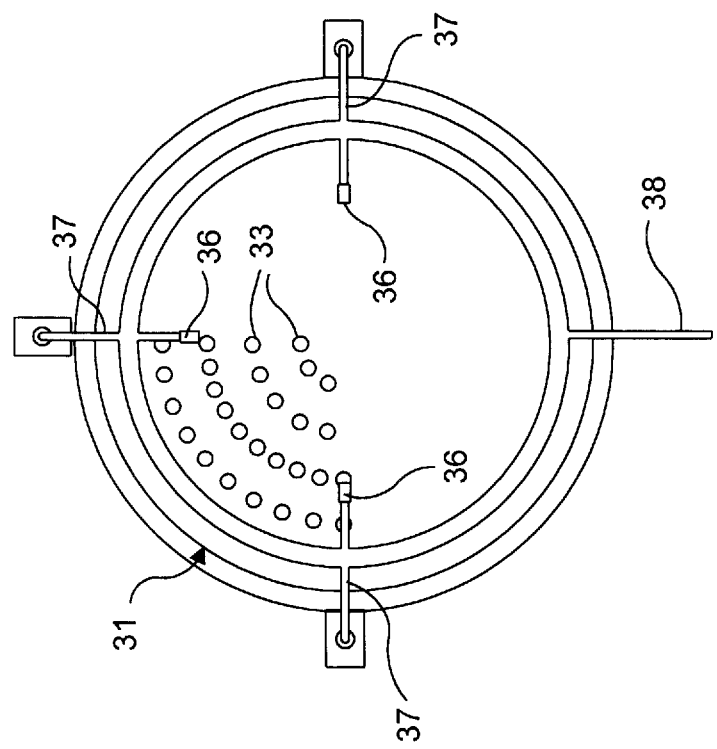
FIG. 2 is a schematic end elevational view taken from the right side in FIG. 1.

A end wall 31 of the stainer body is fixed to the annular brace 25 via an annular weld 32. As seen in FIG. 2, the end wall 31 is provided with an array of perforations 33 extending through to an externally facing surface 34. During operation, the external surface 34 and the outer surface 5 are impacted by jets of liquid ejected by nozzles 35 and 36. These nozzles are preferably distributed around the circumference of the strainer and oriented for covering portions of the surfaces to be cleaned. The number, location and orientation will depend on the overall strainer design parameters. The nozzles are connected via tubes 37 and 38 to the pump 28 and to a second pump 39. The pump 28 uses water within the suppression pool as the cleaning liquid, the water supplied from the discharge side of the pump 28, providing a high pressure fluid stream which is ejected from the nozzles to clean any plugged perforations after passage of the scraper blades. The second pump 39 is connected to a supplemental source of water for supply to the nozzles. This is an independent alternative source of water, as this would be useful in the event that there is a pressure drop from the pump 28 because of strainer blockage, for example, or to maximize discharge from the pump 28.

The strainer assembly 1 may be disposed on a base plate 40 which also supports the posts 17 and 18, and the hydraulic actuator or motor 14, with the base plate located at or near the bottom of a suppression pool at a nuclear power plant. This allows for connection to the process pipe 27.

When emergency cooling is required, the pump is energized to draw water from the suppression pool for supply to the nozzles used for cooling the reactor core. The water is drawn into the strainer body through the perforations. Sludge and debris in the suppression pool accumulates on the outer strainer surface. However, these accumulations are continually removed as the scrapers 7 are actuated to move over the surface when the pump 28 is started. The second pump 39 may alternatively be actuated if necessary to assure that a fluid is supplied to the nozzles and hydraulic actuator.

Referring to FIG. 3, a core spray loop system 41 used for emergency core cooling and residual heat removal is shown. The core cooling pump 28 obtains water from a suppression pool 42 through a pair of strainers 1a and 1b and a feed line 43. Water discharged from the pump 28 is directed primarily through a discharge line 44 to spray nozzles 45 located above a reactor core 46 in a reactor pressure vessel 47. A bypass line 48 is provided which maintains a liquid level in the suppression pool. Makeup water for the system is provided from a steam condensate tank 49 through a line 50. This assures that the pump 28 is always provided with sufficient water to effect core cooling. A cleaning line 51 is provided for directing a portion of the discharge from the pump 28 to the spray nozzles used for clearing the strainers and powering the hydraulic motor as shown in previous FIG. 1. The pump 39 is connected through a line 51a to a second fluid source separate from the core spray loop system 41, to assure that there is always a supply of fluid available for the clearing nozzles and hydraulic motor.

Optionally, an acoustic sensor 52 is located with the supply pipe 43 which monitors flow quality to the pump 28. The flow quality, in terms of pressure, quantity and rate, is important to prevent damage to the pump 28. For example, if the strainers become partially blocked, the net positive suction head (NPSH) may drop to a point where cavitation may occur. The flow quality is also monitored using a suction pressure sensor 53 to monitor the suction pressure and a discharge pressure sensor 54 to monitor discharge pressure. A flow sensor 55 is used to determine the quantity and rate of fluid delivered by the pump 28. Each of these sensors is preferably a sensor/transmitter combination so that each of these parameters can be monitored remotely by a controller 56 which can then signal actuators on the valves associated with the system to alter the flow patterns, as would be understood by a person skilled in this art.

For example, it may not be necessary to operate the strainer cleaning system on a full time basis. If the pressure conditions indicate no serious restrictions in the flow through the strainers, a valve 57 can be shut, to halt the fluid supply to the nozzles and hydraulic motor. The pump 39 can also be started or stopped by the controller, depending on the monitoring parameters. For example, if a restriction is detected but the controller receives a signal from the flow sensor indicating that the discharge flow is relatively low, it can maintain the valve 57 in the closed condition, and instead start pump 39 and open a valve 57a to begin the strainer cleaning process.

While various surface cleaners may be used, two are preferred. The first, shown in FIG. 1, is a blade scraper, which has an edge in close proximity to the strainer surface. By removing the bulk of the accumulated debris, any remaining solids between the blade edge and each perforation should either collapse or be dislodged by the cleaning nozzles.

Figure 4A:
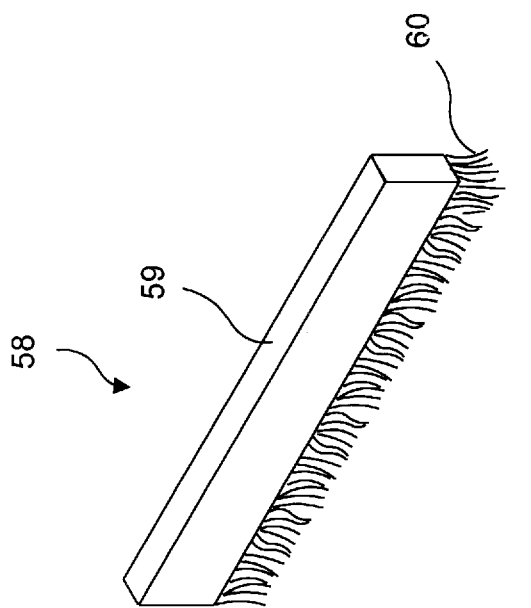
FIGS. 4a and 4b show a brush surface cleaner according to the present invention.
Figure 4B:
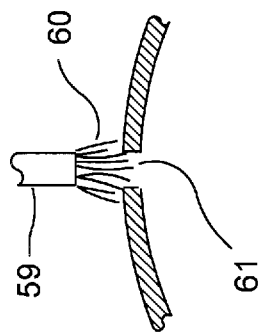

The second type of surface clearer is a brush. Referring to FIGS. 4a and 4b, a surface clearer 58 has an elongated bar 59, similar to a scraper, which acts as a brush back. A plurality of bristles 60 extend from the bar into contact with the strainer surface, preferably such that the bristles are bent slightly back opposite to the direction of rotation. As shown in FIG. 4b, this allows some of the bristles to poke through each perforation 61 to assure that it is clear.

Although the invention has been described in terms of a particular embodiment, one of ordinary skill in the art can generate additional embodiments and modifications without departing from the scope of the claimed invention. An end scraper may be provided in juxtaposition to the end wall 31 for assisting the nozzle 36 in clearing the end wall of accumulated sludge and debris. Accordingly, it is to be understood that the drawings and descriptions herein are proffered by way of example to facilitate comprehension of the invention and should not be construed to limit the scope thereof.

What is claimed is:

1. A strainer for filtering a pumped fluid, comprising:
    a strainer body having a wall provided with fluid inlet perforations and an outer surface;
    at least one surface cleaner juxtaposed to said outer surface;
    a drive operatively connected to the surface cleaner for moving the surface cleaner relative to the strainer body, drive means operatively coupled to the surface cleaner for rotating the surface cleaner relative to the strainer body; and
    at least one nozzle oriented towards the outer surface for directing a jet of liquid against the outer surface during operation of the drive to clear the perforations.

2. The strainer of claim 1 wherein the strainer body is cylindrical, the wall being a cylindrical wall, the strainer body having a planar end wall provided with a plurality of perforations.

3. The strainer of claim 2 wherein at least one nozzle is oriented towards the cylindrical wall, and further comprising at least one additional nozzle oriented towards the end wall for directing a jet of liquid against the plurality of end wall perforations.

4. The strainer of claim 1, further comprising a pump operatively connected to at least one nozzle for supplying liquid thereto.

5. The strainer of claim 1 wherein the drive means includes a worm gear and a driver coupled to the worm gear.

6. The strainer of claim 1 wherein the drive means is selected from the group consisting of a hydraulic actuator and an electric motor.

7. The strainer of claim 1, further comprising a connector on the strainer body for coupling the strainer body to an inlet conduit of a pump.

8. The strainer of claim 1 wherein the surface cleaner is a scraper.

9. The strainer of claim 1 wherein the surface cleaner is a brush.

10. A method for filtering pumped fluid, comprising:
    coupling a strainer body to a pump, the strainer body having a wall provided with fluid inlet perforations and having an outer surface;
    disposing the strainer body in a pool of the fluid to be pumped;
    operating the pump to draw fluid through the inlet perforations and the strainer body to the pump;
    moving a surface cleaner relative to the strainer body so that the surface cleaner moves relatively along the outer surface to clean the outer surface of debris;
    mounting the surface cleaner to means for moving the surface cleaner over the strainer outer surface; and
    directing a jet of liquid against the cleaned surface to clear the perforations.

11. The method of claim 10 wherein the strainer body is cylindrical and the wall is a cylindrical wall.

12. The method of claim 10 further comprising providing means for moving one of the strainer body and the surface cleaner relative to each other.

13. The method of claim 12 wherein the moving means is selected from the group consisting of a hydraulic actuator and an electric motor.

14. The method of claim 10 wherein the strainer body has a planar end wall with an externally facing surface, and further comprising directing a jet of liquid against the externally facing surface.

15. The method of claim 10 further comprises providing a second pump and operating the second pump to supply the jet of liquid directed against the cleaned surface.

16. The method of claim 10 further comprising providing a portion of a fluid discharged from the pump as the supply for the jet of liquid directed against the cleaned surface.

17. The method of claim 10 wherein the surface cleaner is selected from the group consisting of a scraper and a brush.

18. A method for providing cooling liquid to a nuclear reactor having a suppression pool comprising:
    providing a pump having an inlet connected to the suppression pool and an outlet connected to spray means associated with the nuclear reactor;
    placing a strainer in the suppression pool, the strainer connected to the pump inlet to prevent debris in the suppression pool from reaching the pump, the strainer having a wall provided with fluid inlet perforations, and having an outer surface upon which the debris collects, the strainer having a surface cleaner disposed relative to the outer surface;
    moving the surface cleaner relative to the strainer so that the surface cleaner moves relatively over the outer surface to clean the outer surface by contacting and removing the debris; and
    directing a jet of liquid against the cleaned outer surface to clean the perforations.

19. The method of claim 18 further comprising mounting the surface cleaner to a means for moving the surface cleaner over the strainer outer surface.

20. The method of claim 19 wherein the moving means is selected from the group consisting of a hydraulic actuator and an electric motor.

21. The method of claim 18 wherein the pump has a discharge line and further comprising supplying a portion of the fluid discharged from the pump as a supply for the jet of liquid directed against the outer surface.

22. The method of claim 21 wherein the moving means is a hydraulic actuator, the pump supplying a portion of the fluid discharged from the pump as a supply for driving the hydraulic actuator.

23. The method of claim 18 further comprising providing a second pump for supplying the jet of liquid directed against the outer surface.

24. The method of claim 23 further comprising providing a hydraulic actuator for moving the surface cleaner over the strainer outer surface, the second pump supplying the liquid for driving the hydraulic actuator.

25. The method of claim 18 further comprising providing a controller connected to sensors for monitoring flow conditions through the pump, the controller capable of initiating movement of the surface cleaner and discharge of the jet of liquid in response to the monitored flow conditions.

26. The method of claim 24 further comprising providing a controller connected to sensors monitoring flow conditions through the pump, the controller capable of starting the second pump for supplying liquid to the hydraulic actuator as the jet of liquid for cleaning the strainer.

* * * * *